United States Patent
Suzuki (10) Patent No.: US 8,427,089 B2
(45) Date of Patent: Apr. 23, 2013

(54) MOTOR DRIVING DEVICE (75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 13/137,783

(22) Filed: Sep. 13, 2011

(65) Prior Publication Data

US 2012/0068643 A1    Mar. 22, 2012

(30) Foreign Application Priority Data

Sep. 16, 2010   (JP) .................. 2010-208311

(51) Int. Cl.
*H02P 23/12* (2006.01)
(52) U.S. Cl.
USPC ............... 318/400.14; 318/400.17; 318/400.2
(58) Field of Classification Search ............. 318/400.14, 318/254, 400.17, 400.2, 400.13
See application file for complete search history.

(56) References Cited

FOREIGN PATENT DOCUMENTS

| JP | 59067475 | * | 4/1984 | .................... 342/397 |
|----|----------|---|--------|-----|
| JP | 2009219288 A | | 9/2009 | |
| JP | 4429338 | | 12/2009 | |

OTHER PUBLICATIONS

Abstract of Japanese Patent Publication No. JP2008-099542, published on Apr. 24, 2008.

* cited by examiner

*Primary Examiner* — Walter Benson
*Assistant Examiner* — Iftekhar Mustafa
(74) *Attorney, Agent, or Firm* — Harness, Dickey & Pierce, P.L.C.

(57) ABSTRACT

A motor driving device driving coil terminals of a three-phase motor to flow three-phase currents includes: a pulse modulator generating three-phase modulation pulses, each of which has a duty ratio in accordance with a voltage level of a coil terminal; a shift amount selection unit selecting a first shift amount corresponding to at least one of two predetermined amounts according to a pulse width of the longest pulse among the three-phase modulation pulses; a first shift unit shifting the second-longest pulse among the three-phase modulation pulses backward by the first shift amount to delay timing; a second shift unit shifting the third-longest pulse among the three-phase modulation pulses backward by a predetermined second shift amount to delay timing; and an inverter driving each of the coil terminals by switching a driving power supply with the three-phase modulation pulses by reflecting shift results of the first and second shift units.

4 Claims, 11 Drawing Sheets

| CONDITION | | | 1: MAXIMUM, 3: MINIMUM | | |
|---|---|---|---|---|---|
| U>V | V>W | W>U | sortU | sortV | sortW |
| 0 | 0 | 0 | 1 | 2 | 3 |
| 0 | 0 | 1 | 3 | 2 | 1 |
| 0 | 1 | 0 | 2 | 1 | 3 |
| 0 | 1 | 1 | 3 | 1 | 2 |
| 1 | 0 | 0 | 1 | 3 | 2 |
| 1 | 0 | 1 | 2 | 3 | 1 |
| 1 | 1 | 0 | 1 | 2 | 3 |
| 1 | 1 | 1 | 1 | 2 | 3 |

| PWMU | PWMV | PWMW | i1as |
|---|---|---|---|
| 0 | 0 | 0 | invalid |
| 0 | 0 | 1 | iw |
| 0 | 1 | 0 | iv |
| 0 | 1 | 1 | -iu |
| 1 | 0 | 0 | iu |
| 1 | 0 | 1 | -iv |
| 1 | 1 | 0 | -iw |
| 1 | 1 | 1 | invalid |

FIG.13

| PWMU | PWMV | PWMW | i2as |
|---|---|---|---|
| 0 | 0 | 0 | invalid |
| 0 | 0 | 1 | iw |
| 0 | 1 | 0 | iv |
| 0 | 1 | 1 | -iu |
| 1 | 0 | 0 | iu |
| 1 | 0 | 1 | -iv |
| 1 | 1 | 0 | -iw |
| 1 | 1 | 1 | invalid |

FIG.14

| i1as | i2as | sel_iu | sel_iv | sel_iw |
|------|------|--------|--------|--------|
| iu | iu | i1 | | |
| iu | iv | i1 | i2 | |
| iu | iw | i1 | | i2 |
| iu | -iu | i1 | | |
| iu | -iv | i1 | i2m | |
| iu | -iw | i1 | | i2m |
| iv | iu | i2 | i1 | |
| iv | iv | | i1 | |
| iv | iw | | i1 | i2 |
| iv | -iu | i2m | i1 | |
| iv | -iv | | i1 | |
| iv | -iw | | i1 | i2m |
| iw | iu | i2 | | i1 |
| iw | iv | | i2 | i1 |
| iw | iw | | | i1 |
| iw | -iu | i2m | | i1 |
| iw | -iv | | i2m | i1 |
| iw | -iw | | | i1 |
| -iu | iu | i1m | | |
| -iu | iv | i1m | i2 | |
| -iu | iw | i1m | | i2 |
| -iu | -iu | i1m | | |
| -iu | -iv | i1m | i2m | |
| -iu | -iw | i1m | | i2m |
| -iv | iu | i2 | i1m | |
| -iv | iv | | i1m | |
| -iv | iw | | i1m | i2 |
| -iv | -iu | i2m | i1m | |
| -iv | -iv | | i1m | |
| -iv | -iw | | i1m | i2m |
| -iw | iu | i2 | | i1m |
| -iw | iv | | i2 | i1m |
| -iw | iw | | | i1m |
| -iw | -iu | i2m | | i1m |
| -iw | -iv | | i2m | i1m |
| -iw | -iw | | | i1m |

MOTOR DRIVING DEVICE

CROSS-REFERENCE TO RELATED APPLICATIONS

The present application claims priority to and incorporates by reference the entire contents of Japanese Patent Application No. 2010-208311 filed in Japan on Sep. 16, 2010.

BACKGROUND OF THE INVENTION

1. Field of the Invention

The present invention relates to a motor driving device for driving a three-phase motor.

2. Description of the Related Art

In related arts, as a three-phase motor, a three-phase brushless motor is known. The three-phase brushless motor does not involve the abrasion of a brush to provide good durability, resulting in the three-phase brushless motor being widely used accordingly. In the widely used type of a three-phase brushless motor, rotation torque is generated by three phases of alternating current flowing through three-phase coils. In order to control the three phases of current, a rectangular wave has been widely used due to the easiness in configuring a driving circuit. However, in recent years, sinusoidal wave current-based driving control with the use of a sinusoidal wave is being performed to improve quietness and driving efficiency. Further, a vector control scheme increasingly becomes a usual practice in which amplitudes and phases of the three-phase sinusoidal wave currents are controlled with high precision. This scheme requires detection of phase currents corresponding to at least two phases. However, using two sensors in detecting two phase currents increases a cost. Accordingly, an alternative scheme is proposed in which a bus current between an inverter and a DC power supply is detected by using one current sensor so as to reproduce an original phase current (at least two phases of the current) (for example, see Japanese Patent Application Laid-open No. 2008-99542). This scheme is called a one-shunt current detection scheme (single-shunt current detection scheme). In the one-shunt current detection scheme, an output signal of a current sensor is sampled at appropriate timing to detect two phases of current: a phase (the maximum phase) of current providing the maximum voltage level; and a phase (the minimum phase) of current providing the minimum voltage level.

The above-described one-shunt current detection scheme suppresses the cost for the sensor. However, the bus current appears only when one or two phases in a three-phase pulse width modulation (PWM) inverter is in the ON state. Therefore, in order to obtain current levels of two phases from the bus current, it is necessary to perform sampling on two bus current levels: the level of a bus current during an interval in which only one phase is ON and the level of a bus current during an interval in which two phases are ON.

However, because three-phase PWM pulses are generated by a high speed modulation of a three-phase sinusoidal wave current, there is certainly an occasion in which two pulse widths become very close or equal to each other and, in its vicinity, the interval for sampling the bus current becomes very short. In general, it is difficult to perform sampling on the bus current during an interval in which two PWM pulse widths are close to each other partly because a detection result of the bus current may become obscure due to the bandwidth limiting in a current sensor or a detection amplifier and partly because there is a limitation on the conversion speed of an AC/DC converter (ADC) generally used as a sampling unit. In other words, although two phase currents can be detected in a case in which the respective voltage levels thereof are sufficiently far from each other, two phase currents cannot be detected when the maximum phase voltage is close to the intermediate phase voltage or when the minimum phase voltage is close to the intermediate phase voltage.

Accordingly, in Japanese Patent Application Laid-open No. 2008-99542 and the literature disclosed as a reference in the section of the related art, during the interval in which two PWM pulse widths are close to each other, the pulse widths are corrected not to be close to each other. For example, Japanese Patent Application Laid-open No. 2008-99542 discloses a motor control device which performs a vector control on a three-phase motor based on the one-shunt current detection scheme. In this motor control device, an ab coordinate system is defined such that the ab coordinate system rotates by an electric angle of 60 degrees in a stepwise manner according to a phase of a voltage command vector as viewed from the U phase axis. Further, in a rotating coordinate system which rotates at the same speed as a magnetic flux exerted by a permanent magnet which is provided in a rotor of the motor, given that the direction of the magnetic flux exerted by the permanent magnet is set to be the d axis and the phase rotated by an electric angle of 90 degrees from the d axis is set to be the q axis, a coordinate, employing these axes as the axes of the coordinates is defined as a dq coordinate. Then, the dq coordinates of the voltage command vector are converted into ab coordinates, and it is determined whether or not two phase currents are detectable based on the magnitudes of the coordinate elements (va, vb) of the voltage command vector in the ab coordinate system without correcting the voltage command vector. In a case in which the correction is necessary, the magnitudes of the respective coordinate elements are corrected, and three-phase voltage command values to be supplied to the inverters are created from the corrected voltage command vector.

However, in the conventional pulse width correction scheme described above, the algorithm is likely to be complicated, which makes the scheme difficult to be implemented using an inexpensive circuit or microprocessor. The timing at which twice of sampling on the bus current are performed can be at any position of the PWM interval, before and/or after the correction. In other words, the sampling timing is not concentrated in a given section (the first half section or the second half section) of the PWM interval. Therefore, an ADC serving as a sampling unit operates all the time, preventing the ADC to be used for other purposes or to be used for current detection of other motors by means of time division.

SUMMARY OF THE INVENTION

It is an object of the present invention to at least partially solve the problems in the conventional technology.

According to an aspect of the present invention, there is provided a motor driving device which drives coil terminals (U, V, and W) of a three-phase motor to flow three-phase currents. The device includes a pulse modulator that generates three-phase modulation pulses, each of the pulses having a duty ratio in accordance with a voltage level to be applied to each coil terminal; a shift amount selection unit that selects a first shift amount corresponding to any one of at least two predetermined amounts according to a pulse width of the longest pulse among the three-phase modulation pulses; a first shift unit that shifts the second-longest pulse among the three-phase modulation pulses backward by the first shift amount to delay timing; a second shift unit that shifts the third-longest pulse among the three-phase modulation pulses backward by a predetermined second shift amount to delay timing; and an inverter that drives each of the coil terminals by switching a driving power supply with the three-phase modulation pulses in which shift results of the first shift unit and the second shift unit are reflected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described with reference to the drawings.

Figure 1:
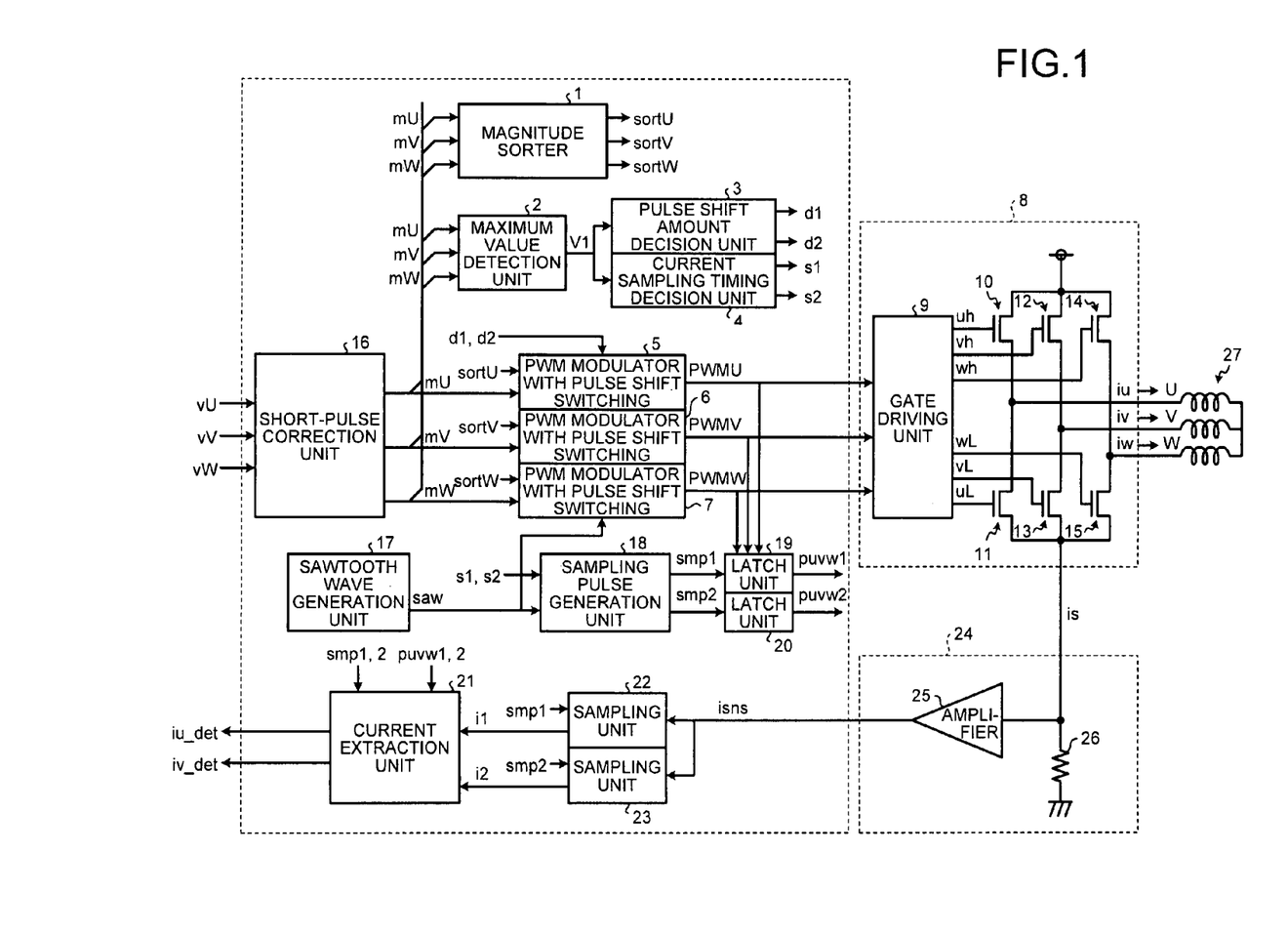
FIG. 1 is a block diagram illustrating an example of a configuration of a motor driving device according to an embodiment of the present invention.

FIG. 1 is a block diagram illustrating an example of a configuration of a motor driving device according to an embodiment.

As shown in FIG. 1, the motor driving device according to this embodiment includes a magnitude sorter 1, a maximum value detection unit 2, a pulse shift amount decision unit 3 serving as a shift amount selection unit, a current sampling timing decision unit 4 serving as a sampling timing generation unit, PWM modulators having pulse shift switchers 5, 6, and 7 each serving as a pulse modulator, an inverter 8 having a gate driving unit 9 and switching element bridges 10 to 15, a short-pulse correction unit 16 serving as a pulse width correction unit, a sawtooth wave generation unit 17, a sampling pulse generation unit 18, latch units 19 and 20, a current extraction unit 21, sampling units 22 and 23, and a current sensor 24 serving as a current detection unit. The pulse shift amount decision unit 3 and the PWM modulators having the pulse shift switchers 5, 6, and 7 constitute first and second shift units. The latch units 19 and 20 and the current extraction unit 21 constitute a phase current extraction unit. Further, the sampling pulse generation unit 18 and the sampling units 22 and 23 constitute a sampling unit.

Hereinafter, three phases are named a U phase, a V phase, and a W phase, respectively. For example, the reference symbols vU, mU, PWMU and the like denote the names of signals in the U phase.

Referring to FIG. 1, input signals vU, vV, and vW correspond to driving voltages of three-phase motor coils, which are applied by a control unit (not shown) with the values measured in analog or digital. The corresponding voltage values are subjected to a pulse width modulation (PWM) using a carrier signal, so that the values are converted into PWM pulses having pulse widths proportional to the voltage levels. Therefore, the equivalent voltage value also corresponds to the pulse width.

The above-mentioned short-pulse correction unit 16 will be described in detail below. Herein below, the input signals vU, vV, and vW are assumed to merely pass through the short-pulse correction unit 16 to become signals mU, mV, and mW, respectively.

The magnitude sorter (sort sequence) 1 determines a sequence of the three-phase voltage levels (also correspond to the pulse widths) mU, mV, and mW depending on their magnitudes (or lengths of the pulse widths), and then assign one of the numbers 1, 2, and 3 to the output values sortU, sortV, and sortW, respectively. The number "1" is assigned to the largest (longest) phase, the number "2" is assigned to the second-largest (second-longest) phase and the number "3" is assigned to the third-largest (third-longest) phase, that is, the smallest (shortest) phase.

Figure 2:
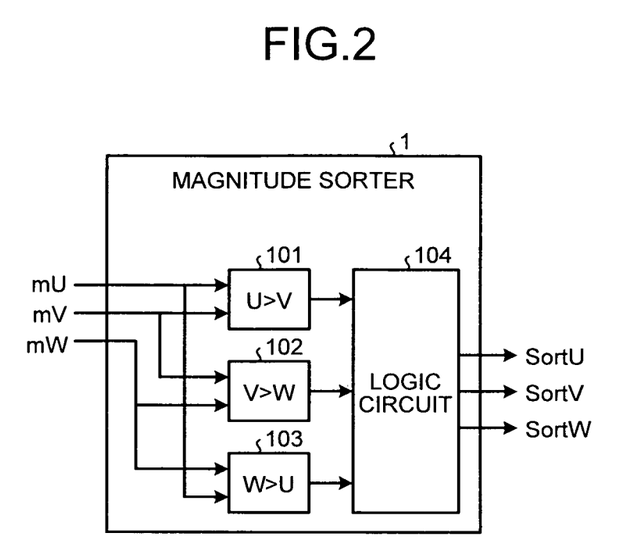
FIG. 2 is a block diagram illustrating an example of a configuration of a magnitude sorter.

FIG. 2 is a block diagram illustrating an example of the structure of the above-mentioned magnitude sorter 1. Further, FIG. 3 is a truth table of a logic circuit 104.

Referring to FIG. 2, the magnitude sorter 1 includes magnitude comparators 101, 102, and 103, each for comparing two values, and the logic circuit 104. For example, the magnitude comparator 101 outputs "1" when the condition "mU>mV" is satisfied, and "0" otherwise. In this way, the magnitudes of the three signals mU, mV, and mW are compared with one another by the comparators, the magnitude relations among the signals are determined by the logic circuit 104, and thus the signals sortU, sortV, and sortW are obtained.

Figure 3:
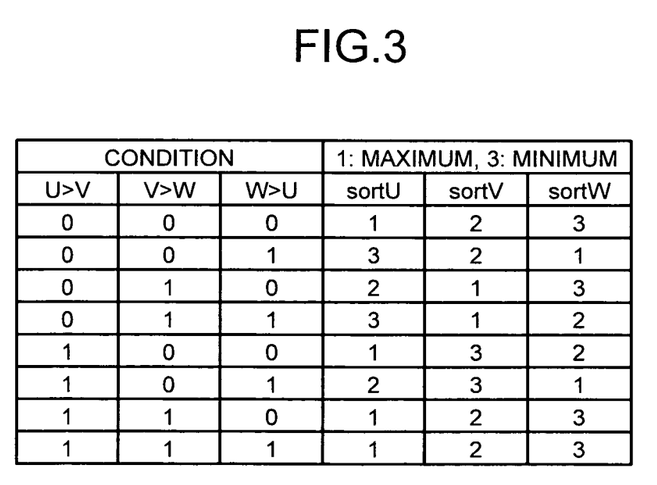
FIG. 3 is a truth table of a logic circuit.

In FIG. 3, when all of the output values of the magnitude comparators 101, 102, and 103 are "1" or "0", all the magnitudes may be the same, but in this case, the output values will be regarded to be in the order of mU, mV, and mW for convenience of explanation. In other cases, because the orders of the three signals can be known from the relation of their magnitudes, the numbers of the orders will be output.

The maximum value detection unit 2 selects the maximum value among mU, mV, and mW, and outputs the selected value as the longest pulse V1. The longest pulse V1 is expressed as in Equation (1) below:

$$V1 = \max(mU, mV, mW) \qquad (1)$$

The longest pulse V1 corresponds to the longest pulse width among three-phase PWM pulses.

Figure 4:
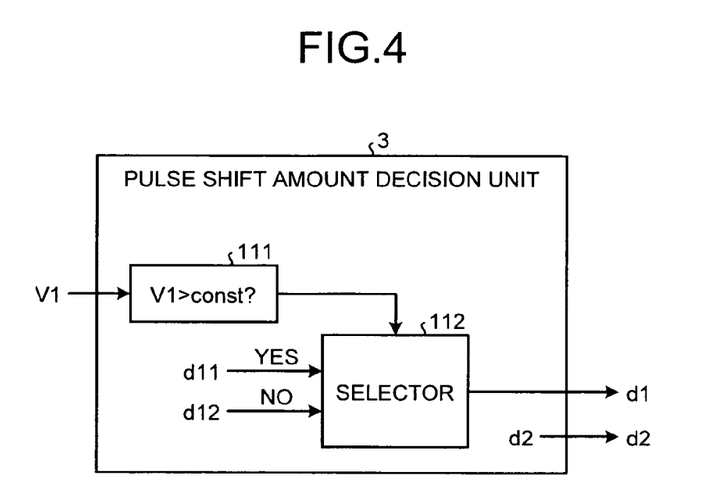
FIG. 4 is a block diagram illustrating an example of an internal configuration of a pulse shift amount decision unit.

FIG. 4 is a block diagram illustrating an example of the internal structure of the pulse shift amount decision unit 3. The pulse shift amount decision unit 3 outputs pulse shift amounts d1 and d2 based on the value of the longest pulse V1.

Referring to FIG. 4, a condition determination unit 111 determines whether or not the value of the longest pulse V1 is larger than a predetermined value "const". If the determination result is affirmative (V1>const), a predetermined value d11 is output as a first shift amount d1 from a selector 112, and if not, a predetermined value d12 is output as the first shift amount d1. Further, a predetermined value is output as a second shift amount d2.

The above-mentioned current sampling timing decision unit 4 will be described later.

The above-mentioned sawtooth wave generation unit (Saw gen) 17 generates a sawtooth wave ("saw") with a predetermined PWM carrier period. In the PWM modulators having the pulse shift switchers 5, 6, and 7, the sawtooth wave "saw" is input as a carrier signal. The voltage signals mU, mV, and mW are subjected to the PWM conversion such that the voltage signals are shifted based on the magnitude ordering of sortU, sortV, and sortW and the shift amounts d1 and d2. Then, PWM pulse signals PWMU, PWMV, and PWMW are output.

Figure 5:
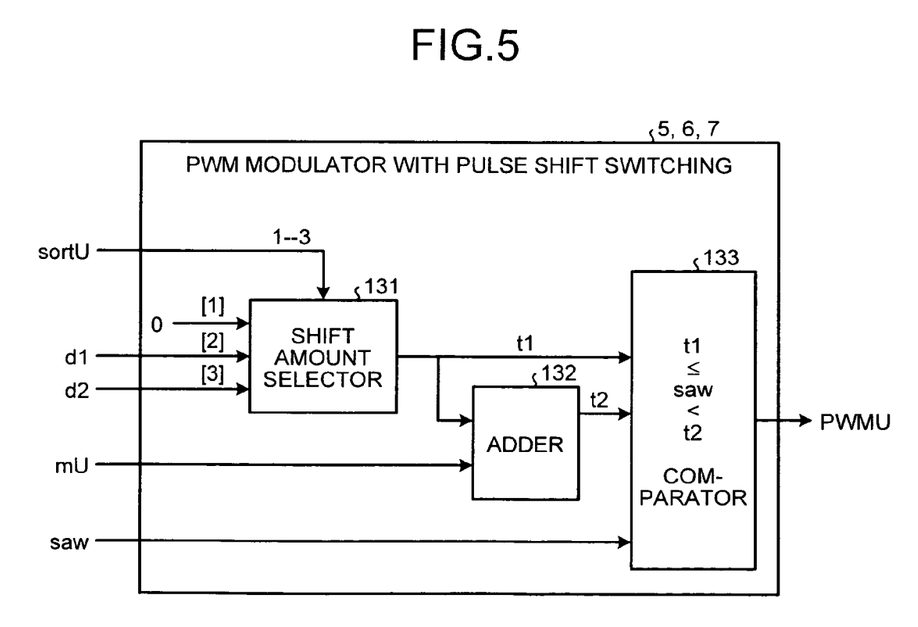
FIG. 5 is a block diagram illustrating an example of a configuration of a PWM modulator with a pulse shift switching device.

FIG. 5 is a block diagram illustrating an example of the structure of the PWM modulator with the pulse shift switcher 5. FIG. 5 illustrates an example only of the U phase, but the V and W phases are similar in the structure to the U phase. Accordingly, the explanation of the PWM modulators having the pulse shift switchers 6 and 7 will be omitted. In FIG. 5, the PWM modulator with pulse shift switcher 5 includes a shift amount selector 131, an adder 132, and a comparator 133.

The signal sortU corresponds to any one of the numbers 1, 2, and 3, and represents the order of the phase in the magnitude (the order of the length of the pulse width).

The shift amount selector 131 selects a shift amount t1 based on the number of sortU as follows:

(1) if sortU=1 (the longest phase), then 0;
(2) if sortU=2 (the second-longest phase), then d1;
(3) if sortU=3 (the shorted phase), then d2.

The adder 132 adds the shift amount t1 to the U phase voltage mU and then outputs the result as t2.

The comparator 133 compares the sawtooth wave carrier signal "saw" with the signals t1 and t2, and then performs the PWM conversion according to the comparison result as follows:

(1) if "t1 saw<t2", then PWMU=1;
(2) if "saw<t1 or saw≧t2", then PWMU=0.

Therefore, the PWM pulse corresponding to the U phase voltage mU is generated so as to be pulled back (shifted) by t1 on the basis of a time when the sawtooth wave carrier signal "saw" becomes 0.

Figure 6:
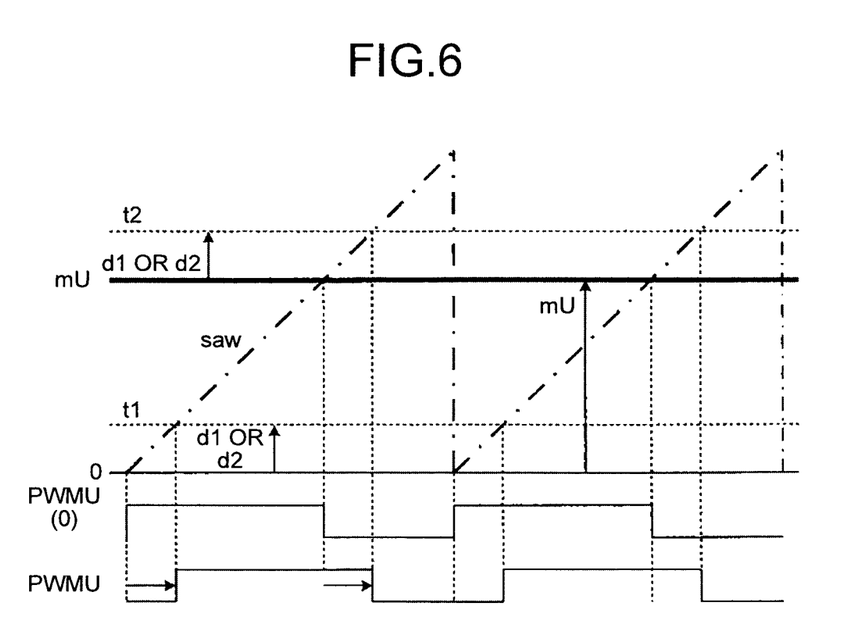
FIG. 6 is a graph illustrating an example of operation waveforms of a PWM modulator with a pulse shift switcher.

FIG. 6 is a graph illustrating an example of operation waveforms of the PWM modulator with the pulse shift switcher 5.

Referring to FIG. 6, when the pulse shift amount d1 or d2 is not applied and the sawtooth wave carrier signal "saw" does not exceed the mU level, the PWM output signal PWMU(0) becomes "1". In contrast, when the shift amount d1 or d2 is applied and the sawtooth wave carrier signal "saw" is between the level t2 which is upwardly offset from the mU level and the level t1 which is upwardly offset from the 0 level, the PWM output signal PWMU becomes "1". In other words, the PWM output signal PWMU is shifted backward by the first shift amount d1 or the second shift amount d2.

The shift amount selector 131 shifts pulses by manipulating the voltage level which has not been compared with the sawtooth wave carrier signal "saw". However, the shift amount selector 131 may be configured to shift the PWM pulse itself which has been compared with the carrier signal.

Figure 7:
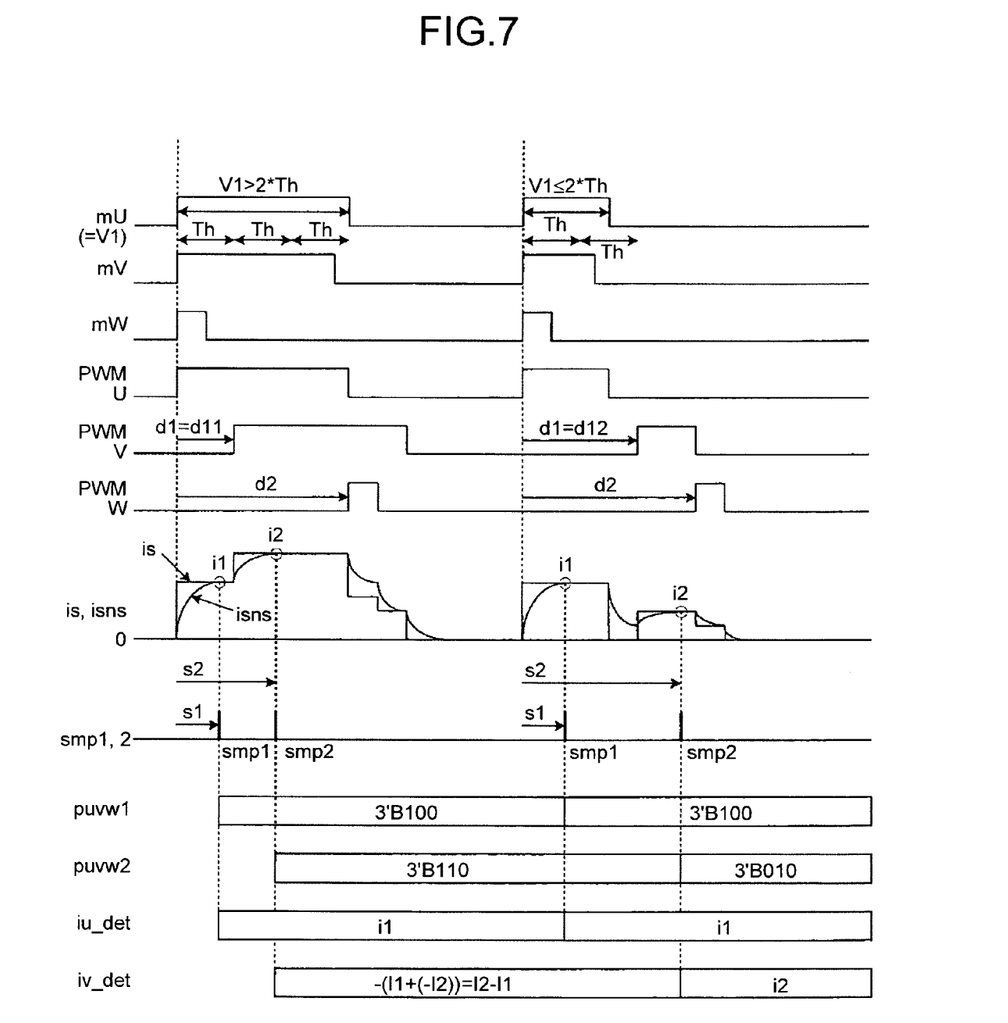
FIG. 7 is a graph illustrating an example of pulse waveform timing from voltage signals mU, mV, and mW to PWM signals PWMU, PWMV, and PWMW (1 to 3 rows in the upper portion), current detection timing (3 to 7 rows in the middle portion), and phase current extraction timing (8 to 12 rows in the lower portion)

FIG. 7 is a graph illustrating an example of pulse waveform timing from the voltage signals mU, mV, and mW to the PWM output signals PWMU, PWMV, and PWMW (1 to 3 rows in the upper portion), current detection timing (3 to 7 rows in the middle portion), and phase current extraction timing (8 to 12 rows in the lower portion). In FIG. 1, the voltage signals mU, mV, and mW correspond to the voltage levels, but in FIG. 7, these signals are illustrated as pulse signals which are not subjected to the pulse shifting yet. In FIG. 7, it is assumed that the voltage signal mU has the maximum (longest) value, and that the other voltage signals have lengths decreasing in the order of mV and mW. Although the time or the voltage level is used as the units of d1 and d2 or mU and mV, both units are not essentially different except for the difference in that they are used before and after the PWM conversion procedure. Therefore, one or the other of the two units will be used selectively depending on the context of the following description.

A minimum PWM pulse width Th is the reference of a minimum PWM pulse width required for the current sampling, and 2×Th is used for the length determination ("const" in FIG. 4) of the longest pulse V1 which is a selection requirement of the shift amount d1.

In FIG. 7, when the values obtained by the following equations are selected as three kinds of predetermined amounts d11, d12, and d2, the time Th required for the current sampling can be secured at a minimum under any circumstances.

| | |
|---|---|
| d11 = Th; | |
| d12 = 2 × Th; | |
| d2 = 3 × Th; | |
| if (V1 > 2 × Th), then | d1 = d11; |
| else, | d1 = d12; |

In this way, the first shift unit can be realized such that d11 or d12 is selected as the first shift amount d1 depending on the longest pulse width (mU) and the second-longest pulse (mV) is shifted backward. Further, the second shift unit can be realized such that the third-longest pulse (mW) is shifted backward using the predetermined value d2 as the second shift amount.

When the longest pulse V1 (=mU) is larger than 2×Th, mV is shifted backward by Th (=d11). In this case, only the pulse mU becomes "1" (the U phase is turned ON) during the initial Th duration. Therefore, the U phase current appears in the bus current, so that the first current can be sampled in the initial PWM interval. Because the pulses mU and mV are guaranteed to become "1" during the next Th duration (Th<t<2×Th), the U+V phase current (−W phase current) appears in the bus current, and the second current can be sampled.

Meanwhile, when the longest pulse V1 (=mU) is smaller than 2×Th, the pulse mU becomes "0" during the second-longest Th duration (in the period Th<t<2×Th). Therefore, with the shift amount of d11, the second current sampling time is not secured. In this case, the pulse mV is shifted backward by 2×Th (=d12). Then, only the pulse mV becomes "1" during the third-longest Th duration (in the period 2×Th<3×Th). At this time, the V phase current appears in the bus current, so that the second current can be sampled.

In addition, even in a case where the pulse shift amount d1 is equal to 2×Th (=d12), the pulse mW is further shifted backward (d2=3×Th) so that only the pulse mV becomes "1" during the second-longest sample time.

As a result, because the pulse width itself is not changed, there is no need to correct the other phases, and the circuit can be simplified. Further, because only the three kinds of predetermined values d11, d12, and d2 are used as the shift amounts, the circuit can be simplified. Furthermore, because the current sampling interval is concentrated just in a range of 3×Th from the reference time, if the width Th is set to be short compared to the width of the PWM interval, the currents of other motors can be easily detected by the same sampling unit in the rest of the PWM interval. Therefore, even in a case where a single sampling unit (ADC) is employed for another purpose or for handling a plurality of motors, the ADC can be used by means of time division so as to reduce cost.

In FIG. 1, the inverter 8 switches the DC power supply using PWM pulses to apply pulse voltages to three-phase coils, and three-phase currents iu, iv, and iw flow are smoothened by coil inductances. As described above, the inverter 8 includes the gate driving unit 9 and the switching element bridges 10 to 15. In recent years, the switching element bridges 10 to 15 are configured with field effect transistors (referred to as FET) in many cases, but bipolar transistors may be used.

The gate driving unit 9 converts the three-phase PWM pulses PWMU, PWMV, and PWMW obtained with the above-mentioned configuration into gate ON/OFF pulses for switching elements. The gate driving unit 9 includes inverting circuits and level-shift circuits in order to turn on any one of upper and lower FETs, for example, the switching element bridges 10 and 11, by the PWM pulse. In order to clarify the description, it is assumed in the following that, when the PWM pulse is "1", the upper FET is turned on and the lower FET is turned off, and when the PWM pulse is "0", the upper FET is turned off and the lower FET is turned on. But this is a design option.

To the ends of three-phase coils 27 of motor, the names U, V, and W are assigned. The positive sign is assigned to the currents flowing into the ends of the coils, and the currents are called three-phase currents iu, iv, and iw.

The above-mentioned current sensor 24, which will be described below, is described here as a short circuit. The switching element bridges 11, 13, and 15 in the lower side of the inverter 8 are connected to a ground (GND), and the switching element bridges 10, 12, and 14 in the upper side of the inverter 8 are connected to the DC power supply. Because the bus current "is" flows through a common line (bus bar) on the ground side or the power supply side, the flowing current is detected by the current sensor 24. This is called a one-shunt current detection scheme.

In the motor driving device shown in FIG. 1, the current sensor 24 is inserted between the switching element bridges 11, 13, and 15 in the upper side of the inverter 8 and the ground (GND) so as to detect the bus current "is". The current sensor 24 may be inserted on the power supply side as described above. However, because a voltage level on the ground (GND) side is lower, circuit elements such as inexpensive amplifiers are preferably used in many cases.

The current sensor 24 is inserted between a resistor 26 and the GND, and a voltage across the resistor is amplified by an amplifier 25, so that a detection value isns proportional to the bus current "is" can be obtained. Besides the resistive scheme, a magnetic scheme may also be generally employed.

The above-mentioned sampling unit 22 performs sampling on the detection value isns in synchronization with sampling timing pulses smp1 and smp2 to obtain current levels i1 and i2, respectively.

Figure 8:
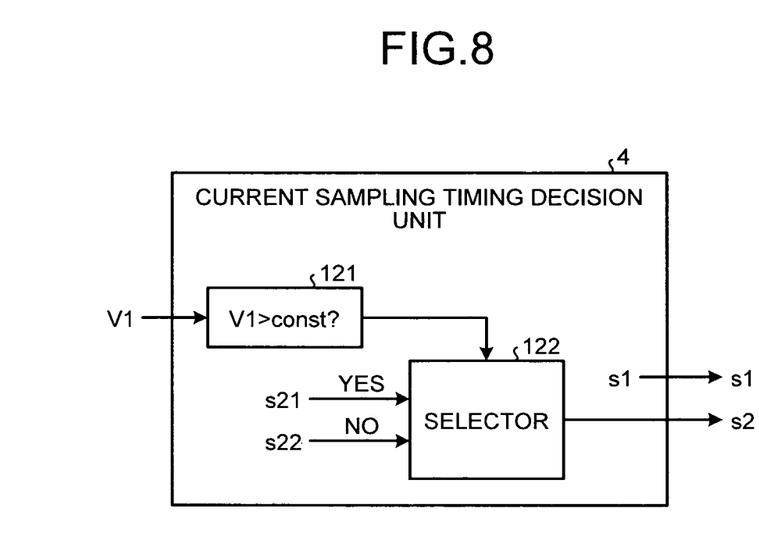
FIG. 8 is a block diagram illustrating an example of a configuration of a current sampling timing decision unit.

FIG. 8 is a block diagram illustrating an example of a configuration of the current sampling timing decision unit 4. The current sampling timing decision unit 4 outputs sampling timing values s1 and s2 according to the length of the longest pulse V1. In FIG. 8, when a condition determiner 121 determines that the longest pulse V1 is larger (longer) than a predetermined value ("const"), a selector 122 outputs s2=s21, and s2=s22 is output otherwise. Further, the current sampling timing decision unit 4 outputs a predetermined value s1.

Figure 9:
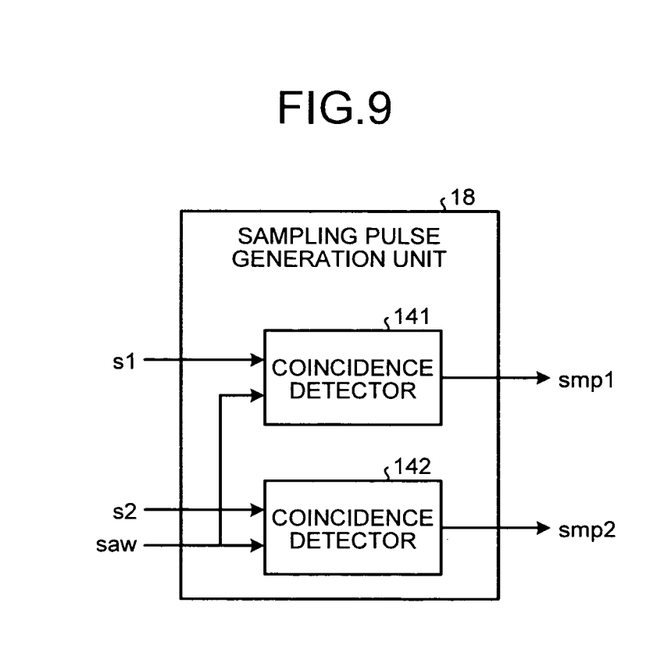
FIG. 9 is a block diagram illustrating an example of a configuration of a sampling pulse generation unit.

FIG. 9 is a block diagram illustrating an example of a configuration of the sampling pulse generation unit 18. The sampling pulse generation unit 18 inputs the sampling timing values s1 and s2 and the sawtooth wave carrier signal "saw", and outputs the sampling pulses smp1 and smp2 at the timing of "saw"=s1 and "saw"=s2. Coincidence detectors 141 and 142 constituting the sampling pulse generation unit 18 output the sampling pulse smp1 when the sampling pulse "saw"=s1 and smp2 when "saw"=s2, respectively.

In the current detection timing example illustrated in the middle portion (3 to 7 rows) of FIG. 7, according to the logic states of the PWM pulses PWMU, PWMV, and PWMW, the bus current "is" appears in the PWM interval in some degree of the current level. The detection value isns detected by the current sensor 24 is more smeared than that of the bus current "is" due to bandwidth limiting of the current sensor 24, so that the signal lagging occurs in change. Because high-frequency noises are effectively prevented by limiting the bandwidth, it is preferable that the possible low bandwidth be designed to be set within an acceptable range of delay.

The sampling pulses smp1 and smp2 occur after the elapse of sampling timing values s1 and s2 from a PWM reference time (sawtooth wave carrier signal "saw"=0). The levels of the detection value isns at this timing are sampled to become the first current level i1 and the second current level i2.

Here, the current sampling timing decision unit 4 is assumed to have the predetermined value "const" being equal to 2×Th. The minimum PWM pulse width Th is the reference of the minimum PWM pulse width required for the current sampling, and 2×Th has been used for the length determination (the predetermined value "const" in FIG. 4) of the longest pulse V1 which is the selection requirement of the shift amount d1, and also in this case, the same value is used.

The following values calculated using Equations 2 to 4 as below are preferably used for the sampling timing values s1, s21, and s22. As for the values d11 and d12, the same values as described above are used.

$$s1=Th-e \quad (2)$$

$$s21=2\times Th-e=d11+Th-e \quad (3)$$

$$s22=3\times Th-e=d12+Th-e \quad (4)$$

The value of e is set to 0 or a value close to 0 so that the sampling is performed at the possible later part in the Th duration (or 2×Th, 3×Th). However, owing to the characteristics of the sampling circuit, because the current signal may be necessarily held for a short period of time even after the sampling pulse occurs, the short period of time may be necessarily secured instead of e=0. Then, when V1 (mU)>2×Th is satisfied, the pulse mV is shifted by d1=Th. Therefore, only the pulse mU becomes "1" at the sampling timing value s1, and the U phase current is sampled as the first current level i1. At the sampling timing value s2 (=s21=2×Th−e), the pulses mU and mV become "1", and the U+V phase (−W phase) current is sampled as the second current level i2.

In addition, when V1 (mU)≦2×Th is satisfied, the pulse mV is shifted by the first shift amount d1=2×Th. Therefore, only the pulse mU becomes "1" at the sampling timing value s1, and the U phase current is sampled as the first current level i1. At the sampling timing value s2 (=s22=3×Th−e), only the pulse mV becomes "1", and the V phase current is sampled as the second current level i2. Further, because the pulse mV is shifted backward (the second shift amount d2=3×Th) from the sampling timing value s2, there is no influence on the current to be sampled at the sampling timing value s2.

In this way, because the current sampling timing is selected from predetermined values according to the shift amount of the PWM pulse, the sampling is performed at fixed timing instead of dispersed timing and the circuit mounting can be simplified. In addition, the sampling timing is concentrated in the first half part of the PWM interval as compared to 3×Th only. Therefore, even in a case where a single sampling unit (ADC) is employed for another purpose or handling a plurality of motors, the ADC is likely to be used by means of time division and the cost can be reduced.

In FIG. 1, the latch units 19 and 20 sample logic levels of the PWM pulses PWMU, PWMV, and PWMW at a point of time when the current sampling pulses smp1 and smp2 occur, and hold the sampled logic levels as signals puvw1 and puvw2, respectively.

The current extraction unit 21 receives the sampled current levels i1 and i2 and the PWM logic levels puvw1 and puvw2 obtained at the sampling timing, and outputs two-phase coil current signals iu_det and iv_det.

Figure 10:
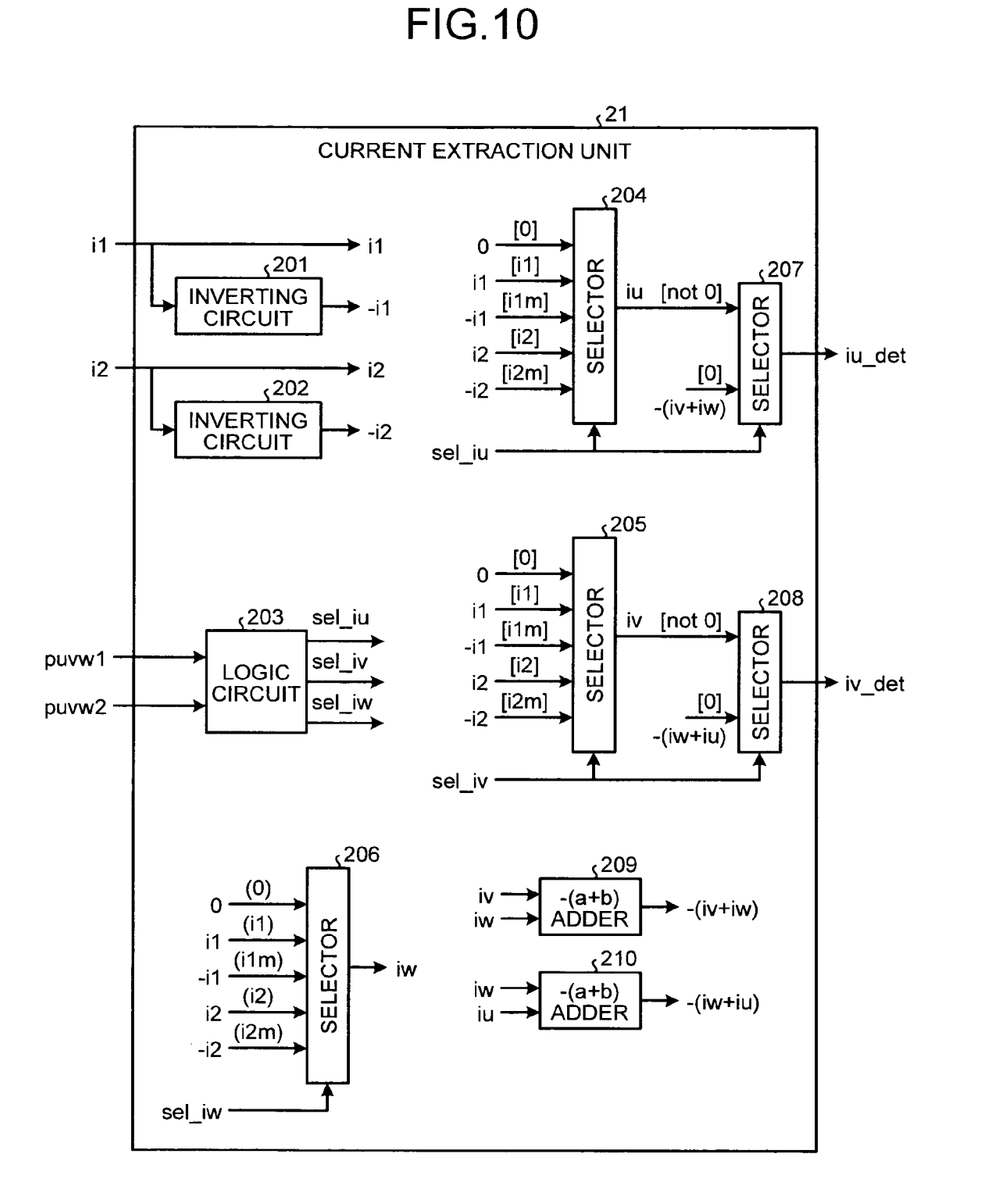
FIG. 10 is a block diagram illustrating an example of a configuration of a current extraction unit.

FIG. 10 is a block diagram illustrating an example of a configuration of the current extraction unit 21.

The current extraction unit 21 includes inverting circuits 201 and 202, a logic circuit 203, selectors 204, 205, and 206, a selector 207, a selector 208, and adders 209 and 210.

The inverting circuits 201 and 202 invert the signs of the current levels i1 and i2 to obtain the inverted current levels −i1 and −i2, respectively. Each of the selectors 204, 205, and 206 selects any one of the current levels i1, −i1, i2, −i2, and 0 by selection indications sel_iu, sel_iv, and sel_iw, and the selected ones tentatively become the respective phase currents iu, iv, and iw. The logic circuit 203 outputs the selection indications sel_iu, sel_iv, and sel_iw for the respective phase currents, which are generated by a combinational logic of the PWM logic levels puvw1 and puvw2.

Figure 11:
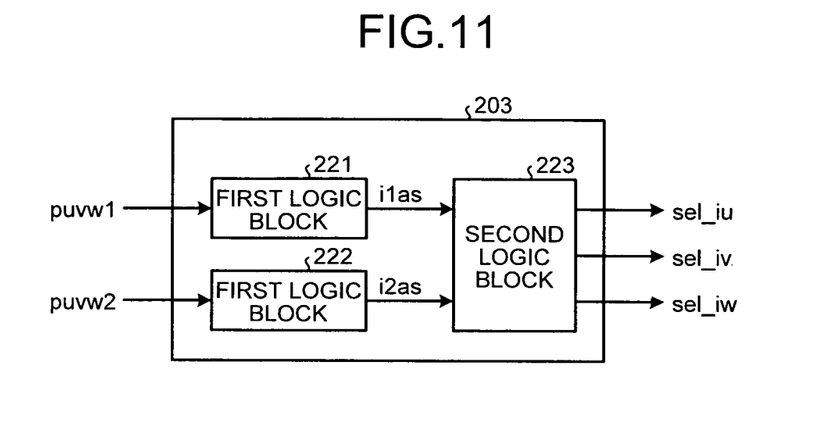
FIG. 11 is a block diagram illustrating an example of a configuration of a logic circuit 203.

FIG. 11 is a block diagram illustrating an example of a configuration of the logic circuit 203.

The logic circuit 203 includes two first logic blocks 221 and 222 and a second logic block 223. The first logic blocks 221 and 222 are configured with the same logic circuit, and determine which current levels iu, iv, iw, −iu, −iv, and −iw correspond to the current levels i1 and i2 at that timing based on the PWM logic levels puvw1 and puvw2. Then, the first logic blocks 221 and 222 output the determination results as "i1as" and "i2as".

Figure 12:
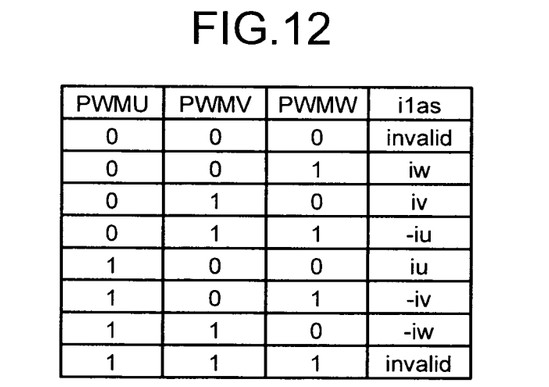
FIG. 12 is a truth table of a first logic circuit.
Figure 13:
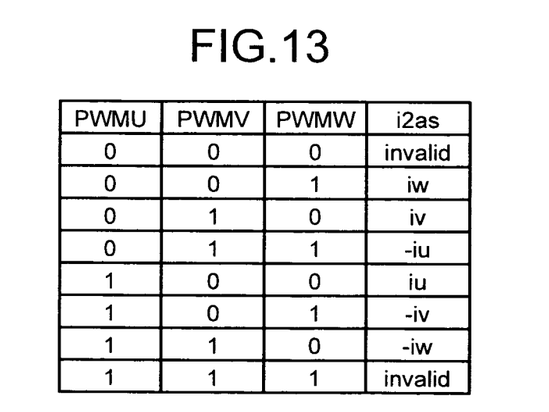
FIG. 13 is a truth table of a first logic circuit.

FIG. 12 is a truth table of the first logic block 221. Further, FIG. 13 is a truth table of the first logic block 222.

The second logic block 223 outputs the selection indications sel_iu, sel_iv, and sel_iw for the respective phase currents on the basis of the output value i1as output from the first logic block 221 and the output value i2as output from the first logic block 222.

Figure 14:
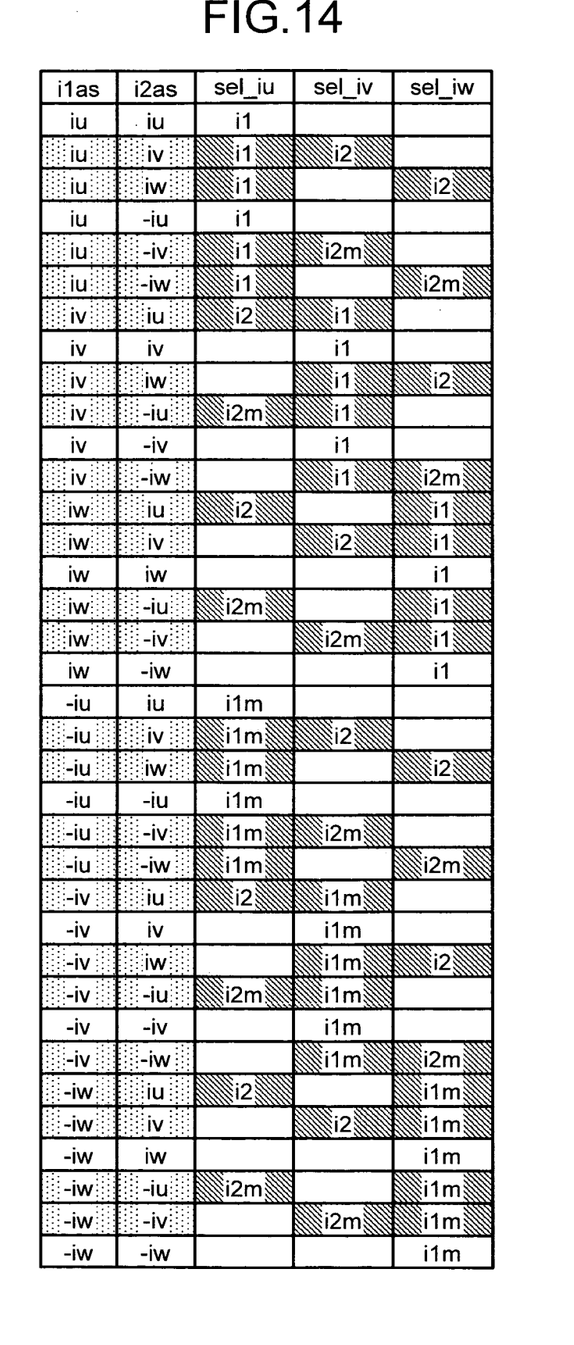
FIG. 14 is a truth table of a second logic circuit.

FIG. 14 is a truth table of the second logic block 223. In FIG. 14, i1 denotes that the current i1 is selected and i1$m$ denotes that the current −i1 is selected. In addition, i2 denotes that the current i2 is selected and i2$m$ denotes that the current −i2 is selected. Furthermore, blanks denote that the current 0 is selected.

In FIG. 10, the adders 209 and 210 calculate "−(iv+iw)" and "−(iw+iu)" from the tentative phase currents iu, iv, and iw.

The selector 207 selects "−(iv+iw)" when the fixed value 0 is selected as the current iu, and in the other cases, the current iu is selected, and the selected signal is output as iu_det.

The selector 208 selects "−(iw+iu)" when the fixed value 0 is selected as the current iv, and in the other cases, the current iv is selected, and the selected signal is output as iv_det.

In the phase current extraction timing shown in the lower portion (8 to 12 rows) of FIG. 7, the PWM logic levels at a time of the sampling pulses smp1 and smp2 are held at puvw1 and puvw2.

In these cases, as for the phase current iu_det, the current i1 is employed for the mU sampling. Because iu=i1 and iw=−i2 are respectively obtained at the time of the first sampling pulses smp1 and smp2, the phase current iv_det is not directly obtained as the tentative current iv but by Equation 5 below:

$$\begin{aligned} iv\_det &= -(iw + iu) \\ &= -(-i2 + i1) \\ &= i2 - i1 \end{aligned} \quad (5)$$

At the second sampling pulse smp2, because i2=iv, so this signal is used as it is.

In this way, two phase coil currents iu and iv can be extracted on the basis of the PWM logic levels puvw1 and puvw2 of the respective modulation pulses and the detection currents i1 and i2 at the time when the sampling timing values s1 and s2 are generated.

Figure 15:
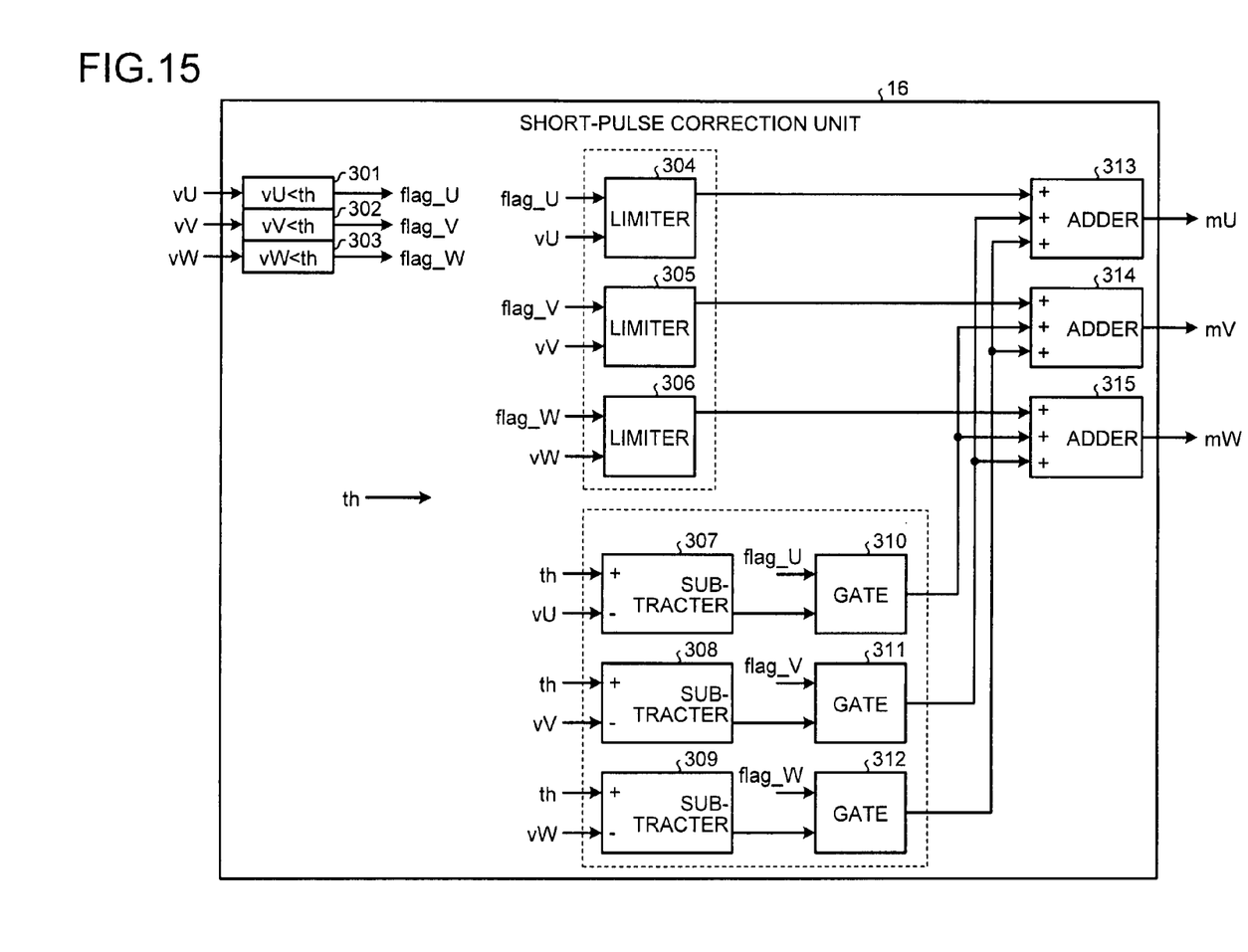
FIG. 15 is a block diagram illustrating an example of a configuration of a short pulse correction unit.

FIG. 15 is a block diagram illustrating an example of a configuration of the short-pulse correction unit 16. When the respective voltage levels vU, vV, and vW are below or equal to a predetermined limit value th, the short-pulse correction unit 16 limits these voltage levels to the value th, and adds differences between the limit value and the unlimited voltage levels to the other phases so as to output the added signals as corrected voltage levels mU, mV, and mW. In this example, the description has been presented using the voltage levels. However, the voltage level is converted into a pulse width proportional thereto by the PWM conversion unit on the later stage, so that a pulse having a value equal to or smaller than a predetermined pulse width will be limited.

The short-pulse correction unit 16 includes comparators 301, 302, and 303, limiters 304, 305, and 306, subtracters 307, 308, and 309, gates 310, 311, and 312, and adders 313, 314, and 315.

The comparators 301, 302, and 303 compare the voltage levels vU, vV, and vW with the threshold value th. When each of the voltage levels is smaller than the threshold value th, the comparators 301, 302, and 303 set flags flag_U, flag_V, and flag_W to "1".

The limiters 304, 305, and 306 limit the outputs thereof to the threshold value th when the flags flag_U, flag_V, and flag_W are "1", and pass the voltage levels vU, vV, and vW without any change when the flags are "0".

The subtracter 307 subtracts the voltage level vU from the threshold value th.

The gate 310 outputs "th−vU" when the flag flag_U is "1", that is, the U phase is smaller than the threshold value th and limited to the threshold value th. When the flag flag_U is "0", that is, the U phase is not limited, the gate 310 outputs "0".

Similarly, in the subtracter 308 and the gate 311, when the flag flag_V is "1", that is, the V phase is smaller than the threshold value th and limited to the threshold value th, "th−vV" is output. When the flag flag_V is "0", that is, the V phase is not limited, "0" is output.

Similarly, in the subtracter 309 and the gate 312, when the flag flag_W is "1", that is, the W phase is smaller than the threshold value th and limited to the threshold value th, "th−vW" is output. When the flag flag_W is "0", that is, the W phase is not limited, "0" is output.

Each of the adders 313, 314, and 315 adds the limited result value and the differences between the threshold value and the other voltage levels when the other phases are limited.

With such a configuration of the short-pulse correction unit 16, the pulse width is corrected not to generate a short-pulse PWM pulse equal to or smaller than a given width per phase. Therefore, even when it is difficult to sample the current because the amplitude of the driving voltage is small and the pulse width is short as a whole, the pulse width capable of being sampled can be secured. In addition, by adding the corrected amount to the pulse widths of the other phases, no distortion occurs in the driving current, so that an accurate driving becomes possible.

Figure 16:
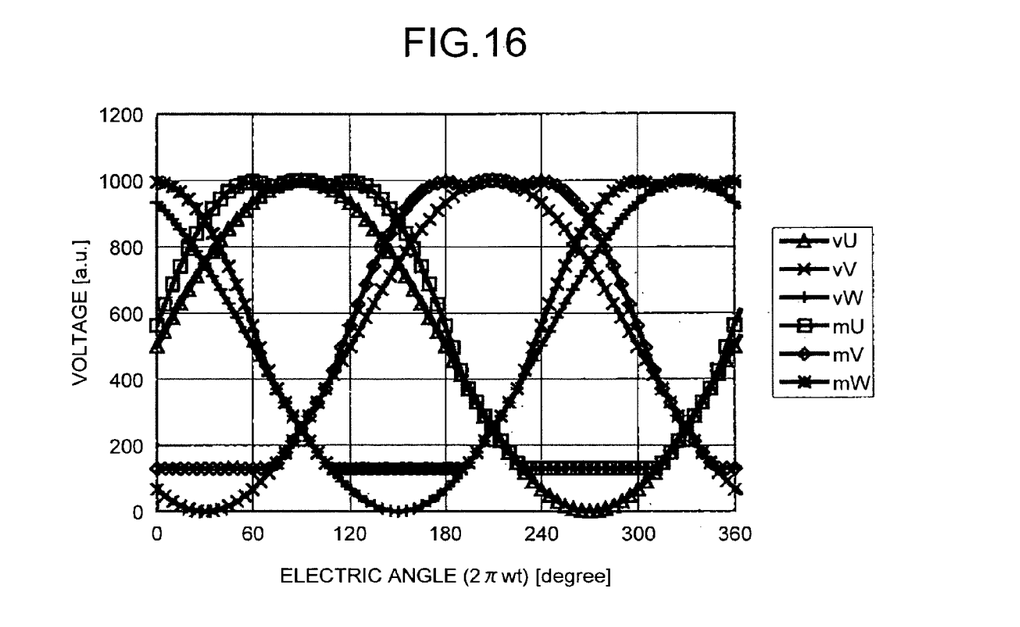
FIG. 16 is a graph illustrating an example of operation waveforms of a short pulse correction unit.

FIG. 16 is a graph illustrating an example of operation waveforms of the short-pulse correction unit 16. In the drawing, the corresponding input voltages vU, vV, and vW are in a sinusoidal wave shape, the amplitudes thereof are 1000 (in an arbitrary unit) in a positive direction, and the threshold value th is 130 (in an arbitrary unit).

The correction outputs mU, mV, and mW are restricted to have values equal to or larger than the threshold value th (=130). When any one phase is limited, a difference between the limited phase and the threshold value th (=130) is added to the other two phases. Although the voltage levels mU, mV, and mW are distorted, if inductance and voltages due to counter electromotive forces are ignored, the motor coil currents iu, iv, and iw have values proportional to the values given by the following equations 6 and 7, as it is known in the related art.

$$iu = +2mU - mV - mW \quad (6)$$

$$iv = -mU + 2mV - mW \quad (7)$$

$$iw = -mU - mV + 2mW \quad (8)$$

Figure 17:
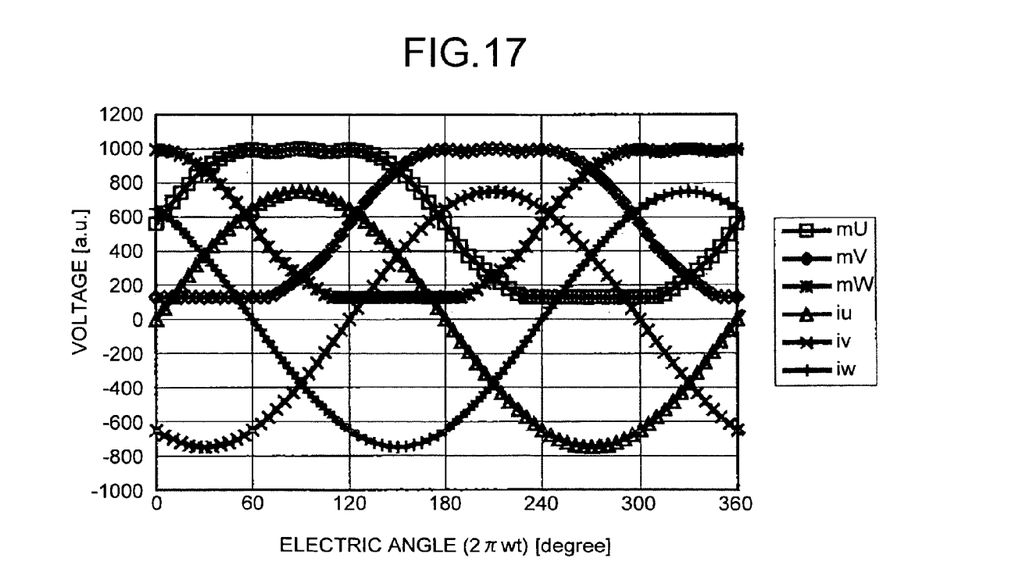
FIG. 17 is a graph illustrating an example of three-phase currents iu, iv, and iw obtained through calculation.

FIG. 17 is a graph illustrating an example of the currents iu, iv, and iw calculated on the basis on the above equations. As for the correction outputs mU, mV, and mW, the conditions thereof are the same as those described above with reference to FIG. 16. As illustrated in FIG. 17, it can be seen that there is no distortion in the motor coil currents iu, iv, and iw.

According to the above-mentioned embodiments, a motor driving device which drives coil terminals (U, V, and W) of a three-phase motor to flow three-phase currents, the device includes: the PWM modulator with pulse shift switchers 5, 6, and 7 as a pulse modulator that generates three-phase modulation pulses, each of the pulses having a duty ratio in accordance with a voltage level to be applied to each coil terminal 27; the pulse shift amount decision unit 3 as a shift amount selection unit that selects a first shift amount d1 corresponding to any one of at least two predetermined amounts d11 and d12 according to a pulse width V1 of the longest pulse among the three-phase modulation pulses; the pulse shift amount decision unit 3 and the PWM modulator with pulse shift switchers 5, 6, and 7 as a first shift unit that shifts the second-longest pulse among the three-phase modulation pulses backward by the first shift amount to delay timing; the pulse shift amount decision unit 3 and the PWM modulator with pulse shift switchers 5, 6, and 7 as a second shift unit that shifts the third-longest pulse among the three-phase modulation pulses backward by a predetermined second shift amount to delay timing; and an inverter 8 that drives each of the coil terminals (U, V, and W) by switching a driving power supply with the three-phase modulation pulses in which shift results of the first shift unit and the second shift unit are reflected.

With this configuration, there is no need for the pulse width itself to be changed, so that the circuit can be simplified. In addition, because only three kinds of predetermined values are used as the shift amounts, the shift amount is not necessary made to be variable, so that the circuit can be simplified. Further, the current sampling interval is concentrated in a range of 3×th (three times the smallest PWM pulse width necessary for the current sampling) from the reference time. Therefore, if the smallest PWM pulse width th necessary for the current sampling is made shorter with respect to the PWM interval width, the same sampling unit (ADC) can be used for another purpose in the remaining PWM interval. Even when a plurality of motors is handled, cost is reduced by driving one sampling unit (ADC) by means of time division. Therefore, without complicated correction for the pulse width, two phase currents can be easily detected through a simple algorithm. In addition, the driving pulses can be generated which are suitable even for the time division of the current sampling.

According to the embodiments, the motor driving device further includes: the current sensor 24 as a current detection unit that detects a current flowing on any one side of a common ground GND and a common power supply of the inverter 8; the sampling pulse generation unit 18 and the sampling units 22 and 23 as a sampling unit that samples the detected current of the current sensor 24 in synchronization with two sampling timing pulses s1 and s2 and outputs corresponding two current values i1 and i2; and the current sampling timing decision unit 4 as a sampling timing generation unit that sets one s1 of the two sampling timing pulses s1 and s2 to a predetermined value and selects any one of two predetermined values s21 and s22 corresponding to the first shift amount d1 as the other one s2.

With this configuration, the sampling timing becomes fixed and not dispersed, so that the circuit can be simplified. In addition, the sampling timing is concentrated just in the first half part of the PWM interval as compared to 3×th (three times the smallest PWM pulse necessary for the current sampling). Therefore, a single sampling unit (ADC) is likely used for another purpose by means of time division, and reduction in cost is achieved. Therefore, bus current sampling timing is appropriately generated with reduced cost, and the current can be detected in a stable manner.

According to the embodiments, the motor driving device further includes: the latch units 19 and 20 and the current extraction unit 21 as a phase current extraction unit that extracts two phases coil currents iu and iv on the basis of logic values puvw1 and puvw2 of the respective modulation pulses and two detected current values i1 and i2 at a time when the two sampling timing pulses s1 and s2 occur. With this configuration, the phase currents can be appropriately detected using a simple and inexpensive circuit.

According to the embodiments, the motor driving device further includes: the short-pulse correction unit 16 as a pulse width correction unit that limits a width of any of the three-phase modulation pulses to a predetermined limit value when the width is equal to or smaller than the predetermined limit value, and adds differences between the predetermined limit value and the unlimited modulation pulses to the other phases.

With this configuration, the pulse width is corrected not to generate a short-pulse PWM pulse equal to or smaller than a given width per phase. Therefore, even when the current sampling is difficult to be performed because the amplitude of the driving voltage is small and the pulse width is short as a whole, the pulse width capable of being sampled can be secured. In addition, because the corrected amounts are added to the pulse widths of the other phases, no distortion occurs in the driving current, so that an accurate driving becomes possible. Therefore, even when driving is performed with a short-pulse width as a whole, appropriate pulse width can be secured and the bus current sampling can be easily and accurately performed.

The invention is very advantageous in that using a simple algorithm, the phase currents of the three-phase motor can be detected with a one-shunt scheme, and a driving device, in which the sampling unit can be used for another purpose or used for a plurality of motors, can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor driving device which drives coil terminals of a three-phase motor to flow three-phase currents, the device comprising:
    a pulse modulator that generates three-phase modulation pulses, each of the pulses having a duty ratio in accordance with a voltage level to be applied to each coil terminal;
    a shift amount selection unit that selects a first shift amount from at least two predetermined amounts, according to a pulse width of the longest pulse among the three-phase modulation pulses;
    a first shift unit that shifts the second-longest pulse among the three-phase modulation pulses backward by the first shift amount to delay timing;
    a second shift unit that shifts the third-longest pulse among the three-phase modulation pulses backward by a predetermined second shift amount to delay timing; and
    an inverter that drives each of the coil terminals by switching a driving power supply with the three-phase modulation pulses in which shift results of the first shift unit and the second shift unit are reflected.

2. The motor driving device according to claim 1, further comprising:
    a current detection unit that detects a current flowing on any one side of a common ground or a common power-supply of the inverter;
    a sampling unit that samples the detected current of the current detection unit at first sampling timing and second sampling timing and outputs corresponding two current values; and
    a sampling timing generation unit that sets one of the first sampling timing and the second sampling timing to a predetermined value and selects, as the other one, any one of two predetermined values corresponding to the first shift amount.

3. The motor driving device according to claim 2, further comprising:
    a phase current extraction unit that extracts two-phases coil currents on the basis of logic values of the respective modulation pulses at the first sampling timing and the second sampling timing and two detected current values detected at the first sampling timing and the second sampling timing.

4. The motor driving device according to claim 3, further comprising:
    a pulse width correction unit that limits a pulse width of any of the three-phase modulation pulses to a predetermined limit value when the width is equal to or smaller than the predetermined limit value, and adds a difference between pulse widths before and after being limited to the predetermined value to the other phase.

* * * * *